United States Patent [19]
Crayford

[11] Patent Number: 6,078,627
[45] Date of Patent: Jun. 20, 2000

[54] CIRCUIT AND METHOD FOR MULTILEVEL SIGNAL DECODING, DESCRAMBLING, AND ERROR DETECTION

[75] Inventor: Ian Crayford, San Jose, Calif.

[73] Assignee: Advanced Micro Devices, Inc., Sunnyvale, Calif.

[21] Appl. No.: 08/992,963

[22] Filed: Dec. 18, 1997

[51] Int. Cl.[7] .................................................. H04L 25/34
[52] U.S. Cl. ...................... 375/286; 375/289; 375/340; 375/287; 329/347; 327/75; 327/262; 327/270
[58] Field of Search ..................................... 375/287, 289, 375/286, 340; 329/347; 327/74, 75, 76, 262, 270

[56] References Cited

U.S. PATENT DOCUMENTS

| | | |
|---|---|---|
| 5,132,572 | 7/1992 | Woo . |
| 5,220,216 | 6/1993 | Woo . |
| 5,227,679 | 7/1993 | Woo . |
| 5,243,625 | 9/1993 | Verbakel et al. .......................... 375/287 |
| 5,264,745 | 11/1993 | Woo . |
| 5,349,612 | 9/1994 | Guo et al. . |
| 5,363,419 | 11/1994 | Ho . |
| 5,367,542 | 11/1994 | Guo . |
| 5,400,370 | 3/1995 | Guo . |
| 5,425,053 | 6/1995 | Matsumoto ............................. 375/287 |
| 5,452,333 | 9/1995 | Guo et al. . |
| 5,457,336 | 10/1995 | Fang et al. . |
| 5,457,719 | 10/1995 | Guo et al. . |
| 5,923,711 | 7/1999 | Wilming ................................... 375/287 |

*Primary Examiner*—Amanda T. Le

[57] ABSTRACT

At least two level detectors compare a multilevel signal to respective prescribed voltage levels to produce corresponding streams of bits. These bit streams are repeatedly delayed in respective digital delay lines, and bits from the digital delay lines are output in parallel to multilevel decoder logic. The multilevel decoder logic converts the parallel bits into a plurality of corresponding two-level decoded bits and performs error detections for an invalid transition in the multilevel signal. The decoded bits may be descrambled and block decoded.

17 Claims, 7 Drawing Sheets

CIRCUIT AND METHOD FOR MULTILEVEL SIGNAL DECODING, DESCRAMBLING, AND ERROR DETECTION

RELATED APPLICATIONS

This application is related to the following commonly assigned applications:

1. "Circuit and Method for High Speed Bit Stream Capture," Ser. No. 08/992,949, filed on Dec. 18, 1997 by Ian Crayford.

2. "Circuit and Method for On-the-Fly Bit Detection and Substitution," Ser. No. 08/993,568, filed on Dec. 18, 1997 by Ian Crayford.

TECHNICAL FIELD

The invention relates generally to digital communications and, more particularly, to improved circuitry and methodology from processing multilevel signals.

BACKGROUND ART

A multilevel signal in digital communications is a signal that is transmitted using more than two discrete voltage levels. One example of a multilevel signal is a decimal signal that uses ten discrete voltage levels, 0V, 1V, through 9V respectively to encode a decimal digit of a number, corresponding to a magnitude characteristic of the signal.

Another type of multilevel signal, MLT-3 (multilevel transmit 3), is commonly used in 100BASE-TX local area networks. MLT-3 is a differentially encoded, pseudoternary signal, consisting of three symbols encoded at three respective voltage levels: a positive level, a zero level, and a negative level. Typically the positive and the negative levels are of the same magnitude but opposite polarity, e.g. +5 volts and −5 volts, respectively. Although there are three symbols, each symbol encodes only one bit of a digital signal.

Since MLT-3 employs a differential encoding, a transition from one level to another; encodes a '1' bit and a non-transition within a bit period encodes a '0' bit. A transition is permissible only to or from the zero level, and transitions from the zero level alternate between the positive and negative levels. In the exemplary MLT-3 signal of FIG. 5, the first '1' bit in the digital bit stream is encoded as a transition from the zero level to the positive level. The subsequent '0' bit results in the MLT-3 signal remaining at the positive level. The next '1' bit causes a transition from the positive level back to the zero level. After two '0' bits, which cause the signal to remain at the same level, the following '1' bit is encoded as a transition from the zero level to the negative. It is an error to have a transition from the positive level to the negative level, bypassing the zero level, at the end of the exemplary signal.

Typically with differential encodings, it is possible for a long string of '0' bits to be encoded at either the positive level or the negative level, causing a large DC component and associated baseline wander problems. Accordingly, in 100BASE-TX systems a bit stream is typically encoded with a 4B5B block code and optionally scrambled to prevent the occurrence of long strings of '0' bits in an MLT-3 encoded signal. Consequently, these networks include circuitry for decoding a scrambled, MLT-3 encoded stream of 4B5B block codes.

Referring to FIG. 6, depicted is a conventional circuit for decoding an MLT-3 encoded signal that is scrambled and 4B5B block coded. Analog slicer 500 receives the MLT-3 encoded signal and clips the signal to fall between two prescribed voltages and hence produce a clean MLT-3 signal MLT-3 decoder 502 recovers the MLT-3signal in the form of a two-level digital NRZ signal (see FIG. 5 for an NRZ signal corresponding to an MLT-3signal). An optional descrambler 504 descrambles the two-level signal according to a known polynomial and five bits of the signal are latched in 5B latch/shift register 506. The latched five bits are applied in parallel to 5B/4B decoder 508 to produce four-bit data and/or control signals.

The MLT-3 decoder 502 of the conventional circuit normally requires multiple, complex analog/digital stages to recover the MLT-3 signal. Complex analog stages may be difficult to manufacture on a monolithic semiconductor substrate. Furthermore, MLT-3 decoder 502 and descrambler 504 serially operate on the bit stream, so that the data rate of the bit stream is limited by the processing times of these circuits.

In some conventional implementations, the bit stream is stored in a random access memory buffer (RAM) or requires processor intervention, which may limit the data rate of the bit stream.

DISCLOSURE OF THE INVENTION

There exists a need for a circuit and method for processing high-speed multilevel data transmissions, preferably multilevel data transmissions without complex analog/digital stages, and advantageously able to be implemented on a monolithic semiconductor substrate.

There exists a further need for a circuit and method for processing multilevel data transmissions without using a RAM buffer, and preferably without processor intervention.

These and other needs are met by the present invention, in which a bit stream is compared with level comparators to a plurality of prescribed voltage levels. The results of he comparisons are buffered in respective digital delay lines and tapped for outputting bits, indicative of each level of the multilevel signal, in parallel to a multilevel decoding circuit. The multilevel decoding circuit operates on the parallel streams of bits According to one aspect of the invention, a circuit for decoding a multilevel signal comprises level detectors for comparing the multilevel signal to respective voltage levels and producing respective bit streams. The circuit comprises digital delay lines, coupled to outputs of corresponding level detectors, for delaying respective bit streams. Each digital delay line includes digital delay elements coupled in series. Decoder logic is coupled to outputs of selected digital delay elements for receiving bits of the bit streams in parallel and decoding the bits to produce decoded bits.

Use of the level detectors and digital delay lines allows the multilevel decode circuit to be implemented without complex analog/digital stages and fabricated on a monolithic semiconductor substrate. The digital delay lines also enable the bit streams to be buffered without RAM or processor intervention, and provide parallel bit streams; hence processing time for multilevel decode can be amortized over many bits.

Another aspect of the invention is an MLT-3 decoder circuit, which comprises a first level detector for comparing a signal to a positive level, and a second level detector for comparing the signal to a negative level. First and second digital delay lines coupled to the outputs of the two level detectors produce first and second delay output signals, respectively. The circuit includes multilevel decode logic coupled to the first and second digital delay lines for decoding first and second bits received in parallel from the first and second digital delay line, respectively.

In one embodiment, the MLT-3 decoder circuit is configured for performing error checking on the first and second bits. In another embodiment, the MTL-3 decoder circuit comprises a third level detector for comparing the signal with a zero level and a third digital delay coupled to the third level detector and the multilevel decode logic for delaying the output signal of the third level detector.

Use of the level detectors and digital delay lines allows the MLT-3 decoder circuit to be implemented without complex analog/digital stages, and fabricated on a monolithic semiconductor substrate. The digital delay lines enable the bit streams to be buffered without RAM or processor intervention. Further, the digital delay line provides bit streams in bit parallel format, so that processing time for MLT-3 decode can be amortized over many bits.

Still another aspect of the invention is a method of decoding a multilevel signal comprising the step of comparing the multilevel signal to a number of levels and producing respective bit streams. The bit streams are repeatedly delayed by a common delay period and bits are tapped in parallel. The tapped bits are decoded to produce decoded bits.

Additional objects, advantages, and novel features of the present invention will be set forth in part in the detailed description which follows, and in part will become apparent upon examination or may be learned by practice of the invention. The objects and advantages of the invention may be realized and obtained by means of the instrumentalities and combinations particularly pointed out in the appended claims.

BRIEF DESCRIPTION OF DRAWINGS

The present invention is illustrated by way of example, and not by limitation, in the figures of the accompanying drawings, wherein elements having the same reference numeral designations represent like elements throughout and wherein:

FIG. 1 (b) is a block diagram of an adjustable delay element of a digital delay line.

FIG. 1 (c) is a block diagram of an adjustable inverter of an adjustable delay element.

FIG. 3 (b) is a diagram of another embodiment of an MLT-3 signal decoding circuit.

BEST MODE FOR CARRYING OUT THE INVENTION

A circuit and method for decoding a multilevel signal, such as an MTL-3 signal, are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HIGH-SPEED DIGITAL DELAY LINE

Figure 1A:
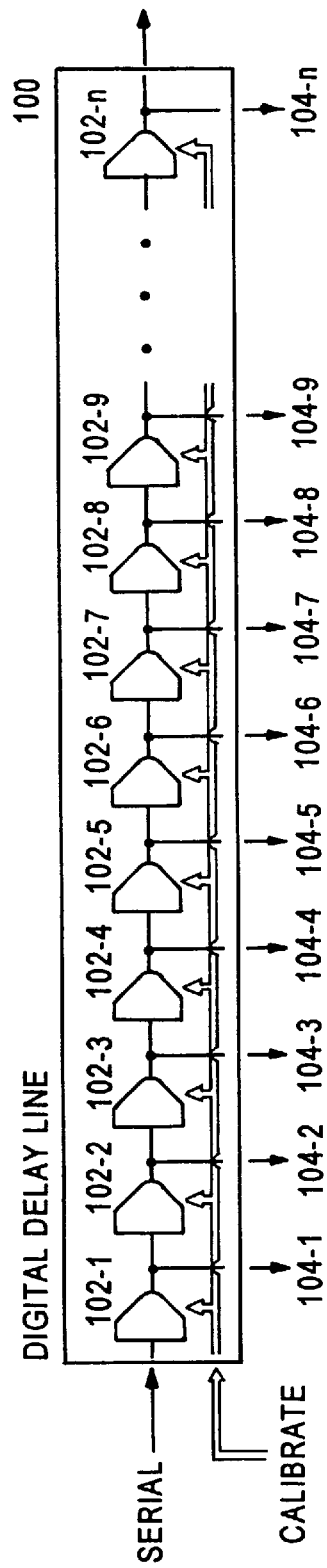
FIG. 1 (a) is a block diagram of a digital delay line with which the present invention can be implemented.

FIG. 1 is a block diagram of an exemplary high-speed, digital delay line 100 with which the present invention can be implemented. The exemplary high-speed digital delay line 100 receives a serial bit stream comprising a plurality of bits spaced at regular intervals, termed "bit stream clock periods." Digital delay line 100 delays the serial bit stream so that an identical serial bit stream is output but with a phase delay of an integral number of bit stream clock periods.

Specifically, digital delay line 100 comprises a plurality of digital delay elements 102-1 to 102-n, coupled in series. Each of the digital delay elements 102-1 to 102-n delays a digital signal for a specified amount of time. Digital delay line 100 may comprise an arbitrary number n of digital delay elements, depending upon any constraints inherent in the semiconductor implementation utilized or other practical considerations. For example, digital delay line 100 can comprise tens of thousands of digital delay elements. Since each of the digital delay elements 102-1 to 102-n of digital delay line 100 is constructed during the same manufacturing process on the same semiconductor substrate, it is likely that the operating characteristics, and hence the delay period, of each digital delay element are nearly identical.

When the common delay period equals the bit stream clock period, each individual bit of the serial bit stream input into digital delay line 100 is delayed by a respective digital delay element. Thus, outputs of a plurality of digital delay elements may be tapped to simultaneously monitor a plurality of bits of the serial bit stream. Accordingly, digital delay line 100 comprises a plurality of taps 104-1 to 104-n coupled to the outputs of the respective digital delay elements 102-1 to 102-n for monitoring portions of the serial bit stream in parallel.

Delay characteristics of any digital circuit will vary from chip to chip and over time because of unavoidable variations in manufacturing and operating conditions. Thus, there is a need to calibrate the delay period of each of the digital delay elements 102-1 to 102-n to match the bit stream clock period. According to one approach, Cot h the delay period and the bit stream clock period ire synchronized to a reliable, precise reference clock, such as a crystal oscillator.

The delay period of each of the digital delay elements 102-1 to 102-n is preferably adjustable by a digital command code as a calibration signal. This calibration signal is produced with reference to a reliable, precise clock signal, preferably by an on-chip digital servo circuit (not shown) such as described in the commonly assigned U.S. Pat. No. 5,457,719, issued to Guo et al. on Oct. 10, 1995. Briefly, the on-chip digital servo circuit comprises an adjustable digital delay line of its own, which it monitors and continually adjusts with a calibration signal in a feedback loop. The calibration signal is shared with other systems on the chip.

Figure 1B:
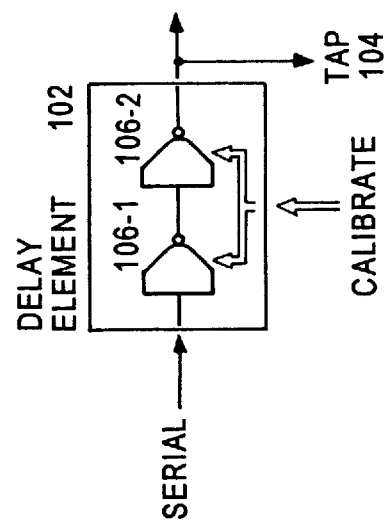

Referring to FIG. 1(b), each adjustable digital delay element 102 comprises two adjustable inverters 106-1 and 106-2, coupled in series, each receiving the aforementioned calibration signal. Thus, the delay period of each of the two adjustable inverters 106-1 and 106-2 is one-half of the bit stream clock period and is controlled by the calibration signal.

Figure 1C:
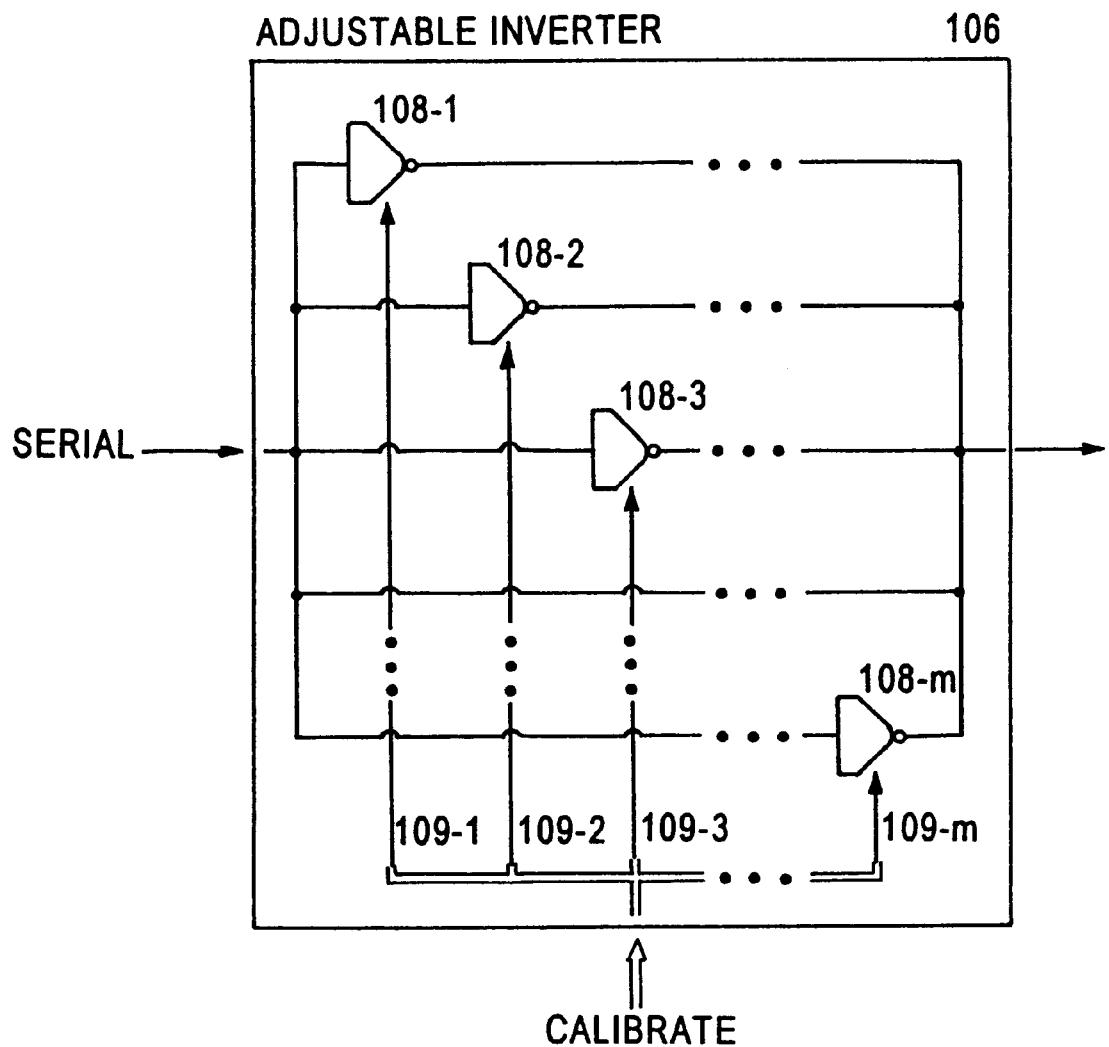

Referring to FIG. 1(c), each adjustable inverter 106 in a preferred embodiment comprises a plurality of switchable inverters 108-1 to 108-m coupled in parallel. Each of the switchable inverters 108-1 to 108-m is switched on or off by one of bits 109-1 to 109-m of the calibration signal. Thus, two of the parameters that determine the propagation delay of an inverter, the P-channel size to N-channel size ratio and the driving power, may be determined for precise control over the delay period. Switchable inverters are described in further detail in the commonly assigned U.S. Pat. No. 5,220,216, issued to Woo on Jun. 15, 1993, and the commonly assigned U.S. Pat. No. 5,227,679, issued to Woo on Jul. 13, 1993.

Accordingly, digital delay line 100 comprises a series of adjustable digital delay elements 102-1 to 102-n, each of which provides a uniform delay period synchronized to a reference clock period according to a calibration signal. Moreover, each adjustable inverter 106 can have a consistent delay period of as little as 70ps. Thus, each adjustable digital delay element 102 can have a consistent delay period of as little of 140 ps. Therefore, digital delay line 100 is high-speed, capable of processing a serial bit stream at data rates up to about 7 GHz. Furthermore, digital delay line 100 provides parallel taps 104-1 to 104-n for simultaneously viewing in parallel any portion of a high-speed serial bit stream.

MULTILEVEL SIGNAL DECODING CIRCUIT

Figure 2:
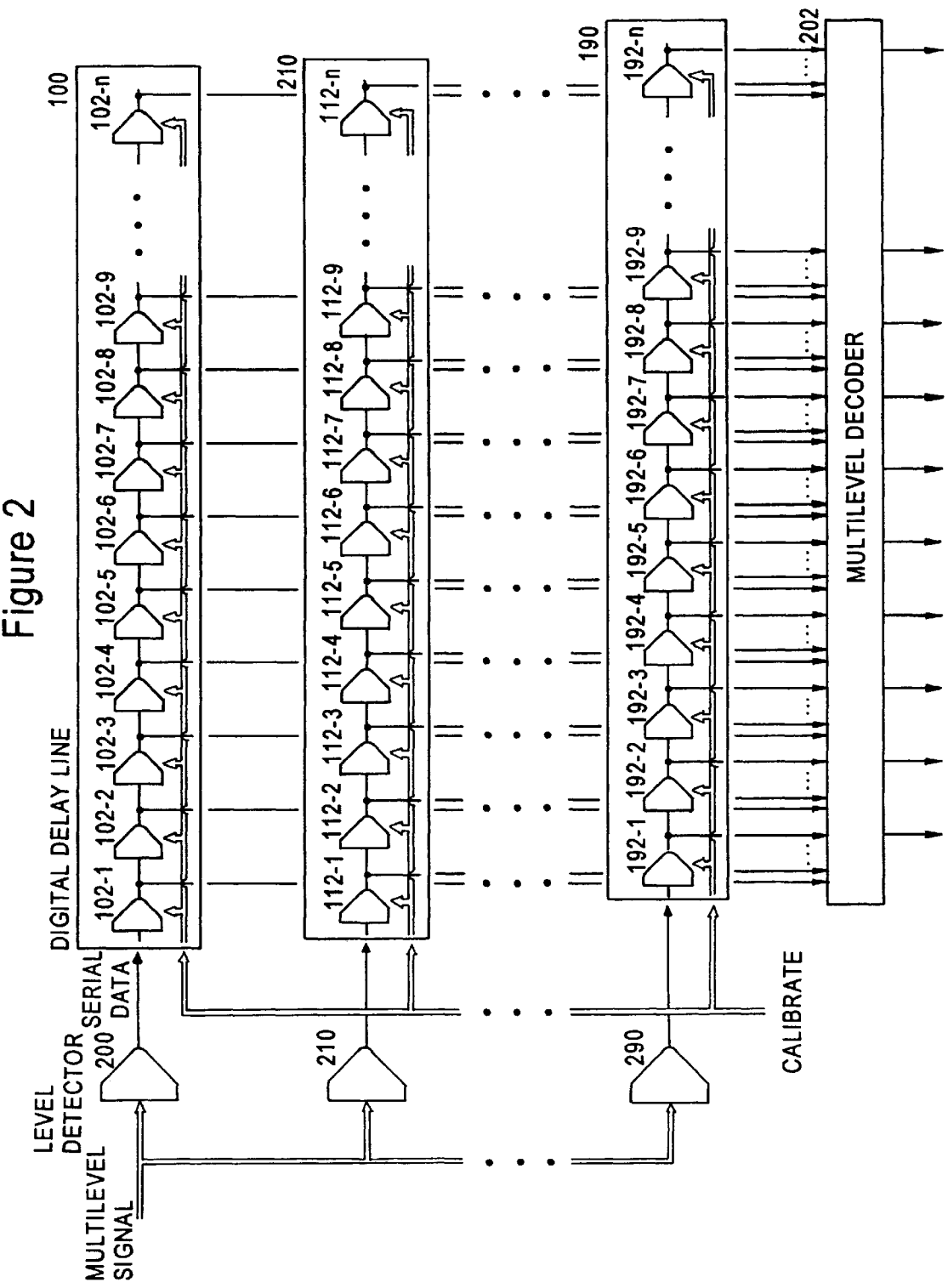
FIG. 2 is a diagram of a multilevel signal decoding circuit according to one embodiment.

Referring to FIG. 2, one aspect of the invention is a circuit for decoding a multilevel signal. A plurality of level detectors 200, 210, to 290 are configured for comparing the multilevel signal to one of the encoding voltage levels of the multilevel signal. Typically, there is a level detector for each of the encoding voltage levels of the multilevel circuit. For example, if the multilevel signal is a decimal signal, then there will be ten level detectors 200, 210, to 290, each set to compare the decimal signal to a respective encoding voltage level. It will be appreciated that the number of level detectors depicted in FIG. 2 is exemplary; the particular number and comparison voltage levels of the level detectors depend on the multilevel signal contemplated for the particular environment in which the present invention is implemented.

Each level detector compares the multilevel signal to a prescribed voltage level. As a result, each level detector produces a digital bit stream at each bit period, with a '1' bit indicating that the multilevel signal includes a symbol at the prescribed voltage level and a '0' bit indicating that the multilevel signal does not include a symbol at that voltage level. Thus, the plurality of level detectors creates in parallel two-level digital information about each encoding voltage level of the multilevel signal, without the need for multiple, complex analog/digital stages.

Each of the digital bit streams is applied to a respective digital delay line, 110, 120, to 190, and repeatedly delayed by a bit period so that each bit of the digital bit stream is available at one of the taps of the digital delay line. Accordingly, the taps are coupled to a multilevel decoder 202 for providing the delayed bits of the bit stream in parallel. It is not necessary to couple all the taps to multilevel decoder 202, only selected bits of a signal that are of interest to the receiving circuit. For example, a network router only needs to decode the destination address bits embedded a multilevel bit stream in order to perform routing decisions.

Multilevel decoder 202 receives in parallel bits indicative of the encoding voltage levels of the multilevel signal. Multilevel decoder 202 includes decoder logic for decoding the multilevel signal from these parallel bits into a plurality of two-level bits corresponding to the value encoded by the parallel bits.

Since multilevel decoder 202 operates on many bits in parallel, the requisite processing time for decoding a bit of a multilevel signal is spread out over many bits. Thus, the decoding cost is amortized over many bits of a multilevel signal, enabling higher data transmission rates. Further, since, the digital delay lines are implemented with digital logic, they can be manufactured as part of a monolithic semiconductor circuit.

MLT-3 DECODING CIRCUIT

Figure 3A:
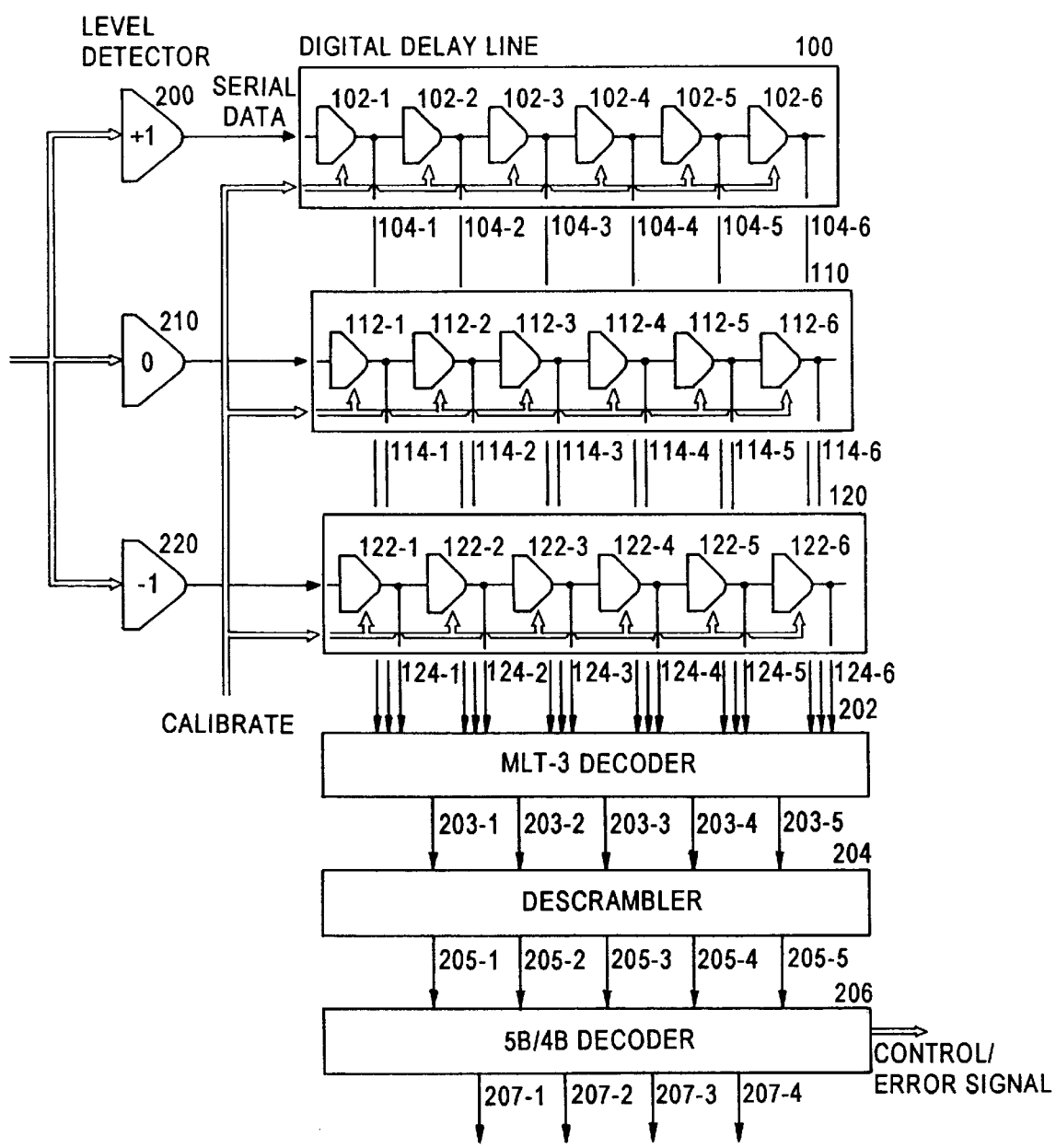
FIG. 3 (a) is a diagram of an MLT-3 signal decoding circuit according to another embodiment.
Figure 3B:
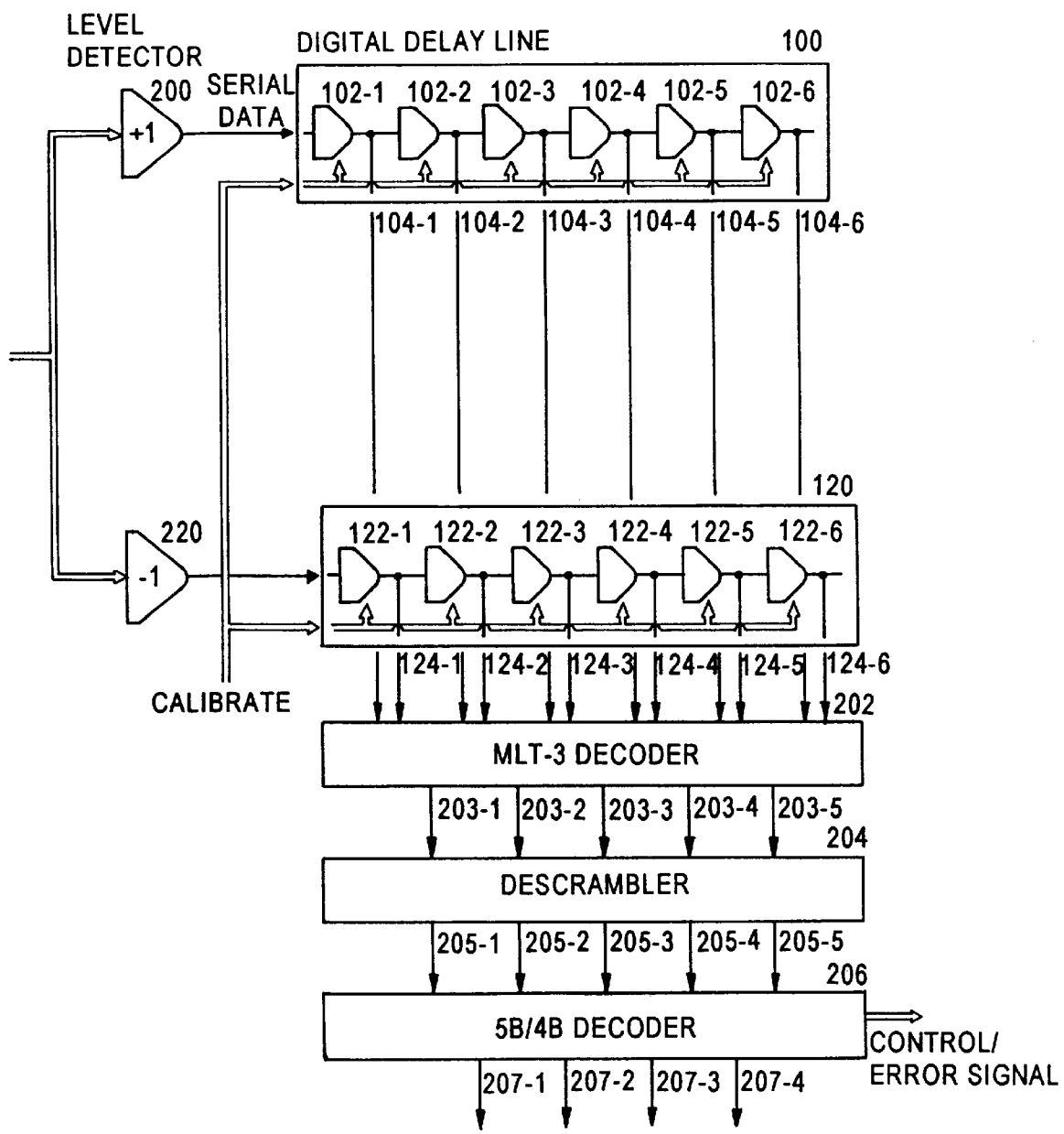

Another embodiment of the present invention, depicted in FIG. 3 (*a*), is a circuit for decoding a 4B5B block encoded, MLT-3 signal, common in 100BASE-TX applications. The circuit comprises three level detectors 200, 210, and 220 for comparing the incoming MLT-3 signal to respective prescribed voltages. Level detector 200 compares the MLT-3 signal to a positive voltage level and outputs serial data in a two-level bit stream indicating whether or not symbols of the MLT-3signal are encoded at the positive voltage level. Similarly, level detectors 210 and 220 compare the MLT-3 signal to a zero voltage level and a negative voltage level, respectively for outputting a two-level bit stream indicating whether or not the pseudoternary symbols of the MLT-3 signal are respectively at the zero and negative voltage levels.

Each bit stream is applied to a corresponding digital delay line 100, 110, and 120 for automatically and repeatedly delaying by a bit period each bit of the bit stream by a digital delay element 102. Each digital delay line comprises the same number of delay elements, because digital information about the voltage levels of the MLT-3 each is dispersed throughout the digital delay lines. For example, if an MLT-3 symbol encoded at the zero voltage Level is received, level detector 210 outputs a '1' bit and applies the '1' bit to digital delay line 110, while level detectors 200 and 220 output a '0' bit to digital delay lines 100 and 120. Likewise, an MLT-3 symbol encoded at the positive voltage level results in a '1' bit being applied to digital delay line 100 and a '0' bit to digital delay lines 110 and 120.

Each digital delay line comprises a plurality of taps for providing bits of each respective bit stream in parallel to MLT-3 decoder 202, which produces from those bits a decoded plurality of bits 203-1 to 203-5. Each digital delay line has the same number of taps. Since MLT-3 is a differential encoding and a differentially encoded bit is specified by the difference between levels of two successive bits of a bit stream, each digital delay line comprises one more tap than the number of decoded bits produced by MLT-3 decoder 202.

Figure 4A:
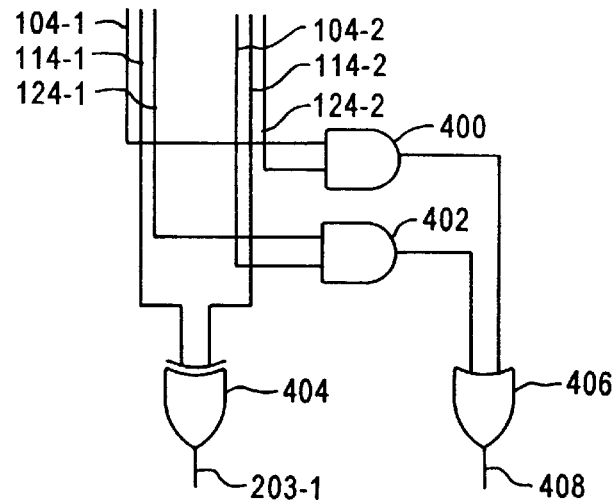
FIGS. 4(a) and 4(b) depict respective digital circuitry for decoding an MLT-3 signal.
Figure 4B:
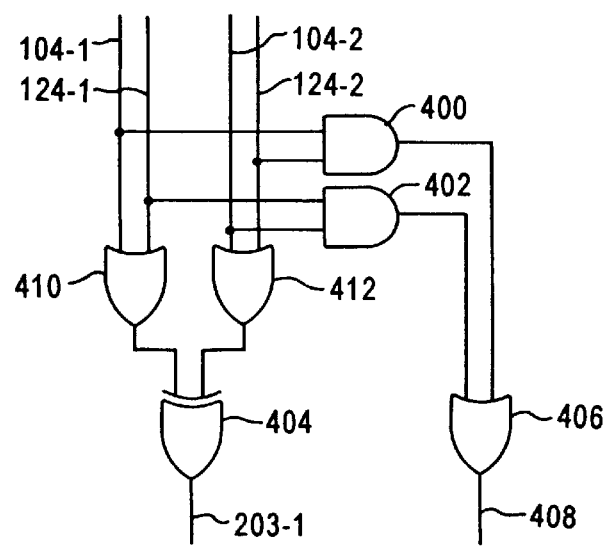
Figure 5:
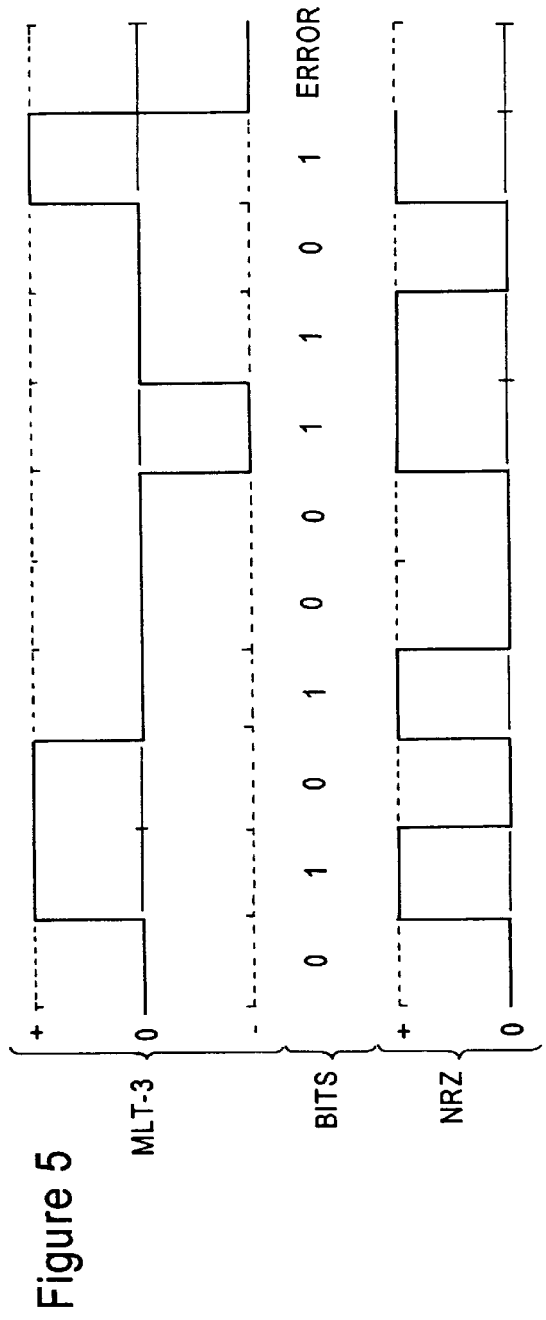
FIG. 5 is a timing diagram illustrating an MLT-3encoding and NRZ encoding of a bit stream.
Figure 6:
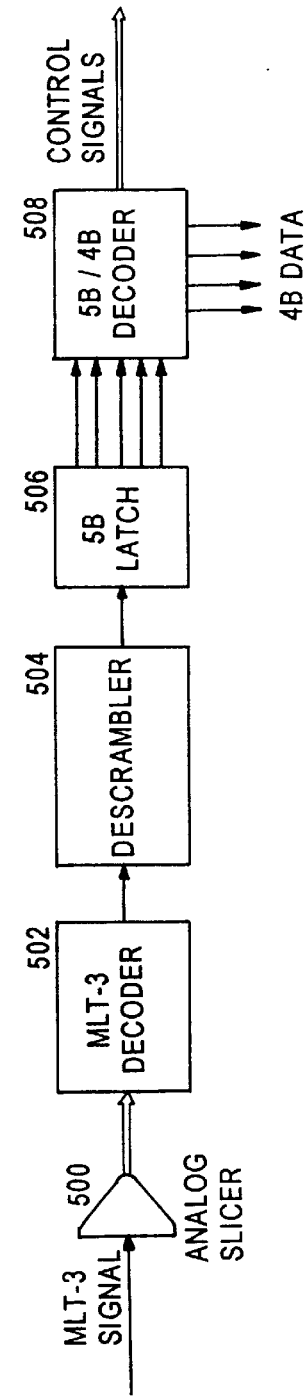
FIG. 6 is a diagram of a conventional MLT-3decoding circuit.

A portion of the decode logic according to one implementation for producing a decoded bit 203-1 based on the difference between levels of a first set of bits 104-1, 114-1, and 124-1 and a second set of bits 104-2, 114-2, and 124-2 is depicted in FIG. 4 (*a*). The bits 114-1 and 114-2, produced by the zero voltage level decoder 210 and delayed by digital delay line 110, are applied to exclusive OR (XOR) gate 404, which outputs a '1' bit if the inputs are at different levels and a '0' bit they are at the same level.

Error detection for the MLT-3 signal is accomplished by the configuration of AND gates 400 and 402 and OR gate 406. AND gate 400 receives a positive level indicating bit 104-1 before a transition and a negative level indicating bit 124-2 after transition and produces a '1' bit only if both bits 104-1 and 124-1 are '1' bits. Thus, AND gate 400 detects a positive level to negative level transition in the MLT-3 signal, which is an erroneous transition. Likewise, AND gate 402 receives a negative level indicating bit 124-1 before the transition and a positive level indicating bit 104-2 after transition and produces a '1' bit only if both bits 124-1 and 104-1 are '1' bits. Thus, AND gate 402 detects a negative level to positive level transition in the MLT-3 signal, which is an erroneous transition. The result of AND gates 400 and 402 is applied to OR gate 406 to produce a signal 408 that either one of the erroneous transitions has been detected.

Although only the decode logic for producing decoded bit 203-1 has been described, it will be appreciated that similar circuitry may be employed to produce the other decoded bits 203-2 to 203-5, and that inner taps are applied to two decoding circuitry. For example, tap 114-2 is applied to the circuitry that produces decoded bit 203-1 as well as to circuitry producing decoded bit 203-2.

MLT-3 decoder 202 has been described as producing five decoded bits 203-1 to 203-5, but the particular number of bits processed in parallel depends on the particular environment in which the present invention is implemented. For example, if the MLT-3 signal is a sequence of 4B5B block codes, then the number of bits produced by MLT-3 decoder 202 is preferably a multiple of five. Accordingly, a preferred number of taps for each digital delay line is one more than a multiple of five. FIG. 3(a) depicts MLT-3 decoder 202 with five outputs 203-1 to 203-5 and digital delay line 100 with six taps 104-1 to 104-6. It will be appreciated, however, that MLT-3 decoder 202 may comprise a number of outputs with other multiples of five, such as ten or fifty.

On the other hand, if the MLT-3 signal is used to transmit a 3B6B block code, then MLT-3 decoder 202 comprises a multiple of six bits and the number of taps of digital delay lines 100, 110, and 120 respectively is one more than a multiple of six, e.g., seven.

Descrambler 204 is coupled to MLT-3 decoder 202 for receiving the decoded bits 203-1 to 203-5, descrambling the bits by applying a known polynomial according to techniques known in the art, and producing as a result descrambled bits 205-1 to 205-5. Preferably, the number of outputs of descrambler 204 is the same as the number of inputs.

Descrambled bits 205-1 to 205-5 are applied to 5B/4B block decoder 206 for converting five bits encoded into a 4B5B code into four data bits 207-1 to 207-4. Since five bits hold twice as much data as four bits, there are some 5B code groups that do not correspond to a 4B data block. These 5B code groups are designated to correspond to control and error signals indicative of the state of the line or the transmission. For example, a 5B code group of 11000 encodes a 'J' starting delimiter, 10001encodes a 'K' starting delimiter, and 01101 encodes a T ending delimiter indicative of the end of a data stream. An error signal may be produced as a result of receiving, for example, a 5B code group of 01100.

By using three level detectors, an MLT-3 decoding circuit can be implemented without the need for multiple, complex analog/digital stages. The three digital delay lines, moreover, can be manufactured as part of a monolithic semiconductor device. Faster data rates up to 7 GHz may be enabled in a practical example because bits are buffered with high-speed digital delay elements, without RAM or processor intervention. Furthermore, the decoding costs are amortized over many bits, because the MLT-3 decoding is performed in parallel.

A SECOND EMBODIMENT OF AN MLT-3 DECODER

It may be appreciated that if an MLT-3 signal is not at the zero level, the signal is at either the positive level or the negative level. Furthermore, if the MLT-3 signal is at the zero level, it is not at either the positive level or the negative level. Therefore, the value of the zero level is redundant for a particular symbol of the MLT-3 signal if the values of the positive and negative levels of the symbol are known.

Accordingly, a second embodiment of the MLT-3 decoder, shown in FIG. 3 (b), eliminates the zero level level decoder 210 and corresponding digital delay line 110 of the first embodiment. Consequently, MLT-3 decoder 202 receives sets of two bits, 104 and 204, instead of three bits, but with increased complexity in the decode logic.

With reference to FIG. 4 (b), the decode logic according to this embodiment comprises two additional OR gates 410 and 412 per decoded bit 203. OR gate 410 receives bits 104-1 and 124-1 to output a bit that indicates that either the positive level or the negative level is present before a possible transition in the MLT-3 signal. Similarly, OR gate 412 receives bits 104-2 and 124-2 to output a bit that indicates that either the positive level or the negative level is present after the possible transition. These bits are applied to XOR gate 404 that outputs a '1' bit if there is a transition and a '0' bit if there is not a transition.

The error detection circuitry using gates 400, 402, and 406 of this embodiment is the same that as in the previous embodiment, and the above description for corresponding circuitry of the previous embodiment is referenced. Likewise, the configuration and operation of descrambler 204 and 5B/4B decoder 206 are also the same as what was described with respect to the similar elements of the previous embodiment.

While this invention has been described in connection with what is presently considered to be the most practical and preferred embodiments, it is to be understood that: the invention is not limited to the disclosed embodiments, but, on the contrary, is intended to cover various modifications and equivalent arrangements included within the spirit and scope of the appended claims.

What is claimed is:

1. A circuit for decoding a multilevel signal, comprising:
   a plurality of level detectors for comparing the multilevel signal to respective voltage levels and producing therefrom corresponding bit streams;
   a plurality of digital delay lines, coupled to outputs of respective level detectors, each digital delay line including a plurality of digital delay elements coupled in series for delaying a corresponding bit stream; and
   decoder logic coupled to outputs of at least selected elements of the each plurality of digital delay elements for receiving in parallel a plurality of bits from corresponding bit streams, and decoding the plurality of bits.

2. The circuit of claim 1, wherein:
   each said digital delay line further includes a calibration input for receiving a calibration signal; and
   each digital delay element includes a calibration input for receiving the calibration signal for adjusting the delay period thereof.

3. The circuit of claim 2, wherein each digital delay element further includes:
   a first adjustable inverter having a first calibration input for receiving the calibration signal; and
   a second adjustable inverter, coupled in series to said first adjustable inverter, and having a second calibration input for receiving said calibration signal.

4. The circuit of claim 1, wherein the delay period of each digital delay element is the same.

5. The circuit of claim 1, wherein delay period of each digital delay element is at least 140 ps.

6. A multilevel decoder circuit comprising:

a first level detector for comparing a multilevel signal to a prescribed positive level;

a first digital delay line coupled to an output of said first level detector for delaying an output signal thereof;

a second level detector for comparing the multilevel signal to a prescribed negative level;

a second digital delay line coupled to an output of said second level detector for delaying an output signal thereof; and multilevel decode logic coupled to said first digital delay line and said second digital delay line and configured for outputting a plurality of decoded bits based on a first plurality of bits received from said first digital delay line and a second plurality of bits received from said second digital delay line.

7. The circuit of claim 6, wherein said multilevel decode logic is further configured for detecting an invalid level transition of the multilevel signal and, in response, outputting an error signal.

8. The circuit of claim 6, further comprising:

a third level detector for comparing the multilevel signal to a zero level; and a third digital delay line coupled to an output of said third level detector for delaying an output signal thereof;

wherein said multilevel decode logic is further coupled to said third digital delay line and configured for outputting said plurality of decoded bits based on said first plurality of bits received from said first digital delay line, said second plurality of bits received from said second digital delay line, and a third plurality of bits received from said third digital delay line.

9. The circuit of claim 6, further comprising a descrambler coupled to said multilevel decode logic for descrambling said plurality of decoded bits to produce a plurality of descrambled bits.

10. The circuit of claim 9, further comprising a block code decoder coupled to said descrambler for block decoding said plurality of descrambled bits to produce a plurality of block decoded bits.

11. The circuit of claim 6, further comprising a block code decoder coupled to said multilevel decode logic for block decoding said plurality of decoded bits to produce a plurality of block decoded bits.

12. A method of decoding a multilevel signal, comprising the steps of:

comparing the multilevel signal to a plurality of levels to produce therefrom a plurality of bit streams;

repeatedly delaying by a common delay period a plurality of bits from each bit stream;

tapping the plurality of bits in parallel; and decoding the tapped plurality of bits to produce a plurality of decoded bits.

13. The method of claim 12, further comprising the step of calibrating said delay period to be equal to a period of the multilevel signal.

14. The method of claim 12, further comprising the step of descrambling the plurality of decoded bits to produce a plurality of descrambled bits.

15. The method of claim 14, further comprising the step of block decoding the plurality of descrambled bits to produce a plurality of block decoded bits.

16. The method of claim 12, further comprising the step of block decoding the plurality of decoded bits to produce a plurality of block decoded bits.

17. The method of claim 12, further comprising the step of detecting for an invalid level transition in the multilevel signal.

* * * * *